April 20, 1965 T. S. GORTON, JR 3,178,765
INSTRUMENT FOR DEVEINING AND SHELLING SHRIMP
Filed May 18, 1961
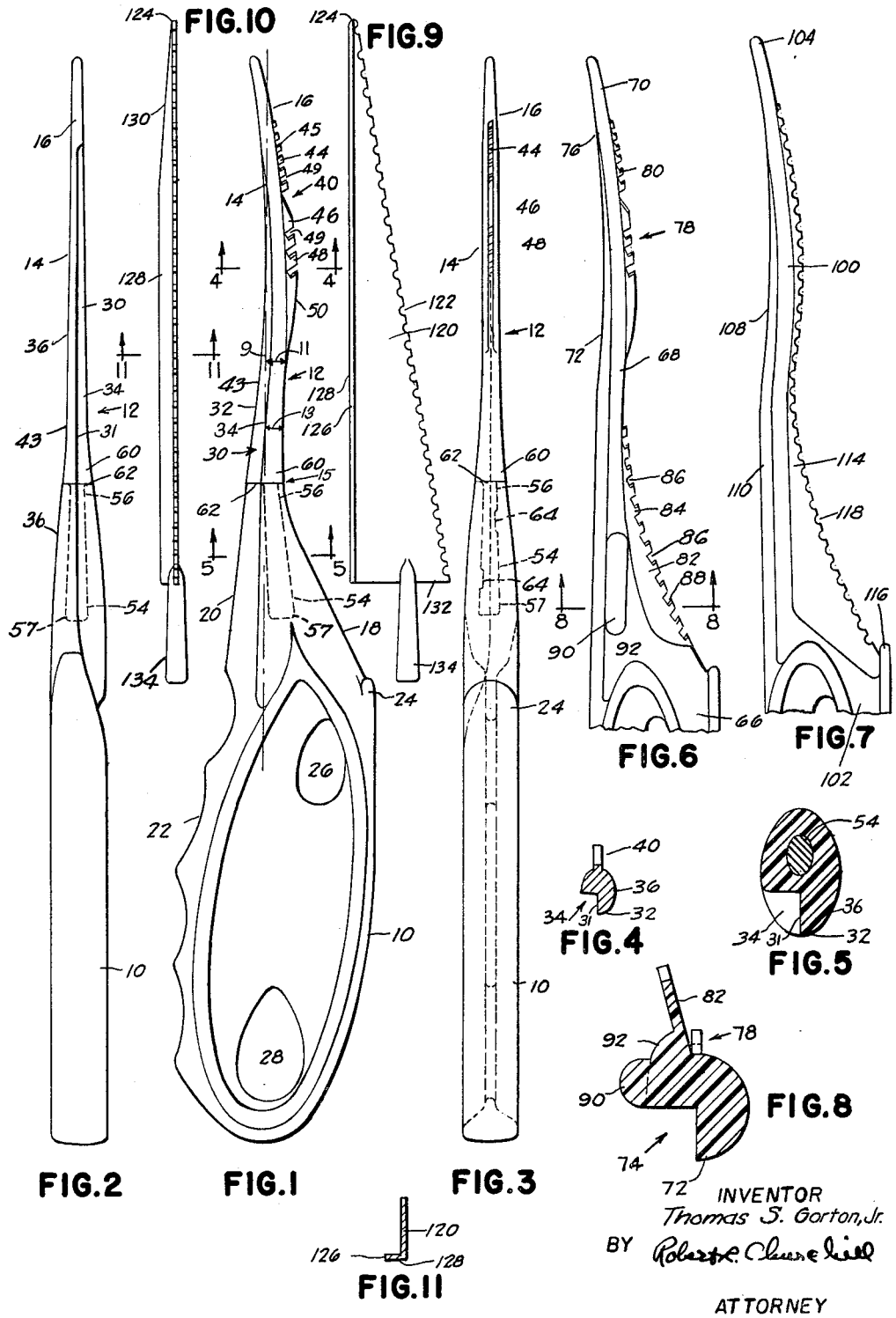
INVENTOR
Thomas S. Gorton, Jr.
BY Robert C. Churchill
ATTORNEY

United States Patent Office 3,178,765
Patented Apr. 20, 1965

3,178,765
INSTRUMENT FOR DEVEINING AND
SHELLING SHRIMP
Thomas S. Gorton, Jr., Cambridge, Mass., assignor to Riverside Inc., Boston, Mass., a corporation of Massachusetts
Filed May 18, 1961, Ser. No. 110,955
9 Claims. (Cl. 17—7)

This invention relates to a novel and improved tool for deveining and shelling shrimp.

The invention has for a principal object to provide a novel and improved tool for deveining and for removing the shell from shrimp in a highly efficient manner whereby substantially all of the shrimp meat is saved.

A further object is to provide a novel and improved shrimp deveiner and shell remover whereby a substantial quantity of shrimp may be cleaned and deshelled in a relatively short period of time.

Another object of the invention is to provide a shrimp deveining and shell removing tool which may be used with a high degree of safety and embodies novel provisions for safeguarding the user's hands from injury, and which may be rapidly and efficiently cleaned during and after use.

A still further object of the invention is to provide a novel and improved tool for deveining and removing shrimp meat from the shells characterized by novel structure whereby meat may be readily removed from the last section and the "spear tail" of the shrimp intact, and the shrimp meat so removed from the shell is highly attractive and appetizing in appearance.

Another object of the invention is to provide a tool for removing shrimp meat from the shell by lifting the shell away from the meat in a predetermined direction whereby the speed of the shell removing operation may be substantially increased.

Still another object of the invention is to provide a tool for removing shrimp meat from the shell in a rapid and efficient manner having novel provision for opening the top rearward portion of the shell to prevent the meat from being crushed.

With these general objects in view and such others as may hereinafter appear, the invention consists in the novel and improved tool for deveining and removing shrimp meat from the shell hereinafter described and particularly defined in the claims at the end of this specification.

In the drawings illustrating the preferred embodiment of the invention:

FIG. 1 is a side view illustrating the present shrimp deveiner and shell removing device;

FIG. 2 is a bottom plan view of the same;

FIG. 3 is a top plan view of the device;

FIG. 4 is a cross section on an enlarged scale taken on the line 4—4 of FIG. 1;

FIG. 5 is a cross section on an enlarged scale taken on the line 5—5 of FIG. 1;

FIG. 6 is a side view of the tool portion of a modified form of the invention with the handle broken away;

FIG. 7 is a side view of still a further modified form of the present invention with the handle broken away;

FIG. 8 is a cross section on an enlarged scale taken on the line 8—8 of FIG. 6;

FIG. 9 is a side view of the tool portion of a still further modified form of the invention;

FIG. 10 is a top view of the tool of FIG. 9; and

FIG. 11 is a cross section taken on the line 11—11 of FIG. 10.

In general the present invention contemplates a highly efficient tool for deveining and removing shrimp meat from the shell, preferably after the head has been removed from the body of the shrimp. In one form of the invention the tool portion of the instrument is of metal and is provided with a handle attached thereto. The upper surface of the forward portion of the tool portion is provided with an elongated upstanding blade arranged to open the viscera cavity of the shrimp and to cut certain portions of the shell of the shrimp. The tool portion and a portion of the handle contain novel provision for breaking the bottom portion of the shell in a predetermined position to facilitate removal of the shell from the meat.

In another form of the invention the upper surface of the forward part of the tool portion is provided with a blade, and a blade is provided at the rear of the tool portion. Provision is also made for keeping the user's fingers away from the cutting surfaces during use.

In still a further form of the invention the instrument is produced from a suitable tough, rigid plastic material and is provided with a continuous cutting blade extending from near the forward end of the tool portion, rearwardly and continuing along the forward portion of the handle. In each form of the invention the forward cutting blade of the tool portion opens the viscera cavity of the shrimp under the shell, and portions of the upper surface of the shell are then cut as the tool is urged through the shrimp.

In operation the relatively small forward end of the tool is inserted into the larger end of the viscera cavity of the shrimp and is urged toward the tail portion. During the forward movement of the tool through the shrimp, portions of the shell are cut and portions broken in such a way that the shell in some cases is completely removed from the shrimp by the tool, and in some instances may be easily removed after the tool is used.

Referring now to the drawings, and to FIGS. 1 through 3 in particular, illustrating the preferred form of the present invention, the present tool comprises a handle portion 10 and a tool portion 12 having an elongated tapering blade member 14. The blade member 14 is preferably relatively thin at its forward end 16 for facilitating its entrance into the viscera cavity of the shrimp and is gradually increased in cross sectional dimension rearwardly toward the handle portion 10. The tool portion is formed with a shallow, curved bottom surface continuing from the handle to and including the blade member. The upper surface is also arched or convexly shaped toward the forward tip of the blade. The tool portion is shaped so that the distance from the longitudinal center line 9 of the tool portion to the upper surface thereof at a point 11 adjacent the rear end of the cutting blade is greater than a corresponding dimension taken at a point 13 rearwardly of the point 11 of the cutting blade. In other words, the upper edge of the cutting surface between points 11 and 15 defines a generally concavely curved portion. The forward upper portion 18 of the handle is gradually increased in cross sectional dimension rearwardly from the junction of the tool portion and the handle. The bottom surface 20 of portion 18 is substantially straight. This portion causes the forward sections, i.e., the larger sections of the shrimp, of the shell to be broken as the tool passes through the shrimp. The handle 10 is provided with finger grips 22 to facilitate holding of the tool during use when it is wet and slimy, and to enable the position of the hand to be changed when cleaning shrimp of different sizes. The handle is also provided with a thumb guard 24 to rest the thumb and to protect the user's thumb from the relatively sharp edge of the shell when larger shrimp are being deshelled. Openings 26, 28 are provided in the central section of the handle to enable the tool to be held and sterilized or conveniently hung up when desired.

As illustrated in FIGS. 1 through 5, the forwardly tapering tool portion 12 is of generally elliptical shape in cross section and is provided with a portion, herein referred to as a runner 30. The runner comprises a long, smooth surface 32 and a groove 34 on one side of the vertical center line of the tool portion which may be wedge shaped in cross section, as shown, and extends along the major portion of the tool and through a coextensive portion of the bottom surface 20 of the handle 10. The wedge shaped groove of the runner is gradually increased in cross sectional dimension as it extends rearwardly toward and into the forward portion of the handle. As best shown in FIGS. 4 and 5, the bottom edge or surface 32 of the runner, while smooth, is relatively sharp. The runner facilitates guiding the tool straight through the shrimp and prevents the shrimp meat from rolling in the shell during the deveining and deshelling operation. As shown in FIG. 2, the cutout portion 34 forms a relatively straight portion 31 defining one side of the runner, and the opposed side edge 36 of the tool portion 12 is generally convex in shape and provides, in effect, a cam surface which lifts the shell of the shrimp upwardly, pulling it against the shrimp meat as the tool moves forward within the shell. The pressure created by the cam surface 36 causes the shell to be ruptured along the side of the shrimp adjacent the cam surface as the pressure within the shell builds up. In this manner the shell of each shrimp is ruptured substantially along the same line and may be removed from the meat in substantially the same manner. This increases the speed of and facilitates the cleaning operation since the deshelling of each shrimp is accomplished in a substantially uniform manner, and the shrimp may be deveined and deshelled without requiring the close attention of the user. In fact the tool may be used without even looking at the shrimp.

In one form of the invention, as shown in FIG. 1, the blade portion 14 is provided with a cutting blade member 40 which comprises a series of teeth commencing at a point spaced a short distance rearwardly from the tip end of the tool and extending rearwardly to a point spaced forwardly of the rear end of the tool portion. A central section 43 is provided between the end of the cutting member 40 and the rear end of the tool portion. The teeth 44 forming the forward portion of the cutting member are relatively small and gradually increase in size as they follow the upwardly curved surface of the tool portion 12. A relatively wide spacer 46 is provided following the last small tooth, and the remaining teeth 48 are larger and spaced farther apart. It may be observed that the cross sectional dimension of the tool portion at the spacer 46 is increased, and increased pressure is thereby exerted on the shell to force the shell between the larger teeth. The size and spacing of the larger teeth permit them to catch and cut the shell at a shell joint and cut through the remaining portions of the shell. The rearmost teeth are also larger in size to enable them to resist wear. The rear portion 50 of the last tooth is provided with a relatively long, downwardly tapered uninterrupted surface which blends into the surface of the tool portion. As shown, the upper surface of the cutting member 40 is substantially flattened and is generally arcuate in shape, and the height of the rear section of the cutting member 40 is from $5/64''$ to $3/16''$.

In the preferred form of the invention the cutting surface 45 of each of the smaller and larger teeth 44, 48 is inclined forwardly and is formed by substantially rectangular slots 49 cut transversely of the flat cutting blade. Preferably, the angle of the cutting surfaces relative to the longitudinal center line of the tool portion is from 30° to 90°.

As illustrated in FIG. 1, the slots 49 defining the spacing between the smaller teeth 44 is relatively narrow. The slots 49 defining the spacing between the rear larger teeth 48 are larger than those between the smaller teeth, and the teeth also increase in area rearwardly toward the handle end of the tool. The fact that the cutting surfaces of the teeth are below the top surface of the cutting blade 40 enables the tool to be continuously cleaned by drawing the cutting blade rearwardly through the user's fingers without cutting the fingers or the gloves worn by the user. The present arrangement of the cutting surfaces of the teeth also enables the tool to be handled in almost any manner, the user being protected from the sharp cutting edges. The cutting edges are also protected from being damaged should the tool be struck against other objects.

In order to securely attach the handle 10 to the tool portion 12 the tool portion is provided with an integral, longitudinally extending tang 54. The tang is generally elliptical in cross section and increases in cross sectional dimension from its relatively small end 56 at the tool portion to its opposite end 57. The small end is preferably offset relative to the end of the tool toward the upper portion thereof. As shown, the diameter of the small end 56 of the tang 54 is substantially smaller than the diameter of the end 60 of the tool portion 12 to which it is attached, and a shoulder 62 is provided surrounding the end 56 of the tang 54. The shoulder surrounding the tang is not less than $1/32''$ wide at any point. The tang is also provided with notches 64 in its opposite sides which aid in locking it within the handle. In assembling the tool the forward end of the handle is preferably molded against the shoulder 62 of the tool portion with the tang extending within the body of the handle. As shown, the forward end of the handle is coextensive with the abutting end of the tool. This enables a tight, attractive joint to be formed between the handle 10 and tool portion 12 without requiring the removal of flash from the molding or casting operation. However, the tool may be attached to the handle by other means.

In operation the shrimp is grasped and straightened out in the user's hand, and the tip end of the tool portion is inserted into the head end of the viscera cavity of the shrimp. The viscera cavity contains the sand vein of the shrimp and runs through the upper portion of the body of the shrimp below the shell. As the tool portion 12 is urged through the viscera cavity the sand vein is loosened in the cavity, and the shoulder meat of the shrimp is cut by the forward small teeth 44 of the tool. The body of the tool portion, together with the runner, is held in the groove of the shrimp between the body of the shrimp meat and under the shell so that the tool portion of the instrument is guided through the shrimp and passes directly through the spear tail located at the end of the shrimp. The following blade portion opens the last two or three shell sections at the top and then opens the top of the spear tail. By opening the spear tail shell all of the shrimp meats are released from the shell, and by holding one of the tail flippers all of the shrimp meat, including the tail meats, may be removed from the shell in one piece. Normally, when shrimp are opened or shelled in accordance with the shelling practices prior to the present invention the tail meats very often are broken and do not remain intact with the body meat. Under the methods presently used to clean shrimp the tail meats can be saved only by using excessive time and careful effort. The present tool enables the shell to be completely emptied of shrimp meat in substantially one operation. As the operating or tool portion of the instrument is urged through the shrimp, the increased rearward cross sectional dimension of the tool portion, the straightening of the runner and the tendency of the shrimp to assume its natural curved position against the straightening action of the tool causes the pressure of the meat against the shell to be built up and the bottom section of the shrimp shell along one side to be broken. The straight runner section of the tool is particularly designed to cause additional breaking pressure to be exerted on the foremost sections of the shell by straightening the shrimp against its resistance to change from its natural curvature. The tool portion of the present instrument is designed so that the smaller forward portion and the small, low forward teeth pass within the shrimp leaving the first, second or third sections of the shell intact. The central section 43 of the tool portion being smaller than the tool portion at the end of the cutting member 40 is held on its course through the shrimp by being enclosed within the shrimp between the unbroken shell and body of the shrimp. The particular structure of the tool body, including the runner, permits the tool to be gradually tapered and thus more easily pass through the shrimp than if it were necessary to provide a sharp increase in cross sectional dimension in order to break the shell. The cam action of the curved side edge of the tool portion causes the meat to be forced downwardly against the adjacent side of the shrimp shell so that when the additional pressure on the meat exerted by the increasing size of the operating portion of the tool is applied to the shell it breaks along the line previously described. This provides for easy shelling. The shell is then removed, leaving the meat intact, and the meat washed under or in running water to remove any remaining portions of viscera or sand vein. The slight arcuate forward section of the tool portion followed by the straight runner section assists in directing the thrust of the blade so that it opens the rear top shell of the shrimp passes directly through the spear tail also opening its top section. The runner 30 bites gently into the shrimp meat and prevents the meat from rolling in the shell, leaving the shoulder meat attached as part of the body meat and guides the tool straight through the shrimp.

Referring now to FIGS. 6 and 8, which illustrate a modified form of the invention, 66 represents a handle substantially similar to the handle of FIG. 1 and an elongated metal tool portion 68 formed integrally with the handle. The tool portion 68 is generally elliptical in cross sectional shape and relatively small at its tip end 70, increasing gradually in cross sectional dimension to a point substantially midway between its ends. The bottom surface comprises a runner 72 having a long, smooth surface and a wedge shaped groove 74 disposed on one side of the vertical center line of the tool portion. As shown in FIG. 6, the runner commences at a point 76 spaced rearwardly a short distance from the tip end 70 and extends rearwardly in a gradual upwardly curved arc to a point substantially midway between the ends of the tool portion 68 and then continues in a plane parallel to the longitudinal center line of the tool portion through a coextensive portion of the handle 66. The forward portion of the upper surface of tool portion 68 is generally arcuate in shape and is provided with a cutting blade 78 similar to that of FIG. 1 having similar angularly cut teeth 80 which correspond in size and shape to those illustrated in FIG. 1 heretofore described. The rear portion of the tool portion 68 is also provided in its upper surface with a cutting blade 82 having a plurality of teeth 84 formed by cutting a series of spaced slots 86 transversely of the member 82 to provide forwardly inclined cutting surfaces 88. The slots are preferably cut at an angle of from 30° to 90° relative to the longitudinal center line of the tool. The forward tooth of the series is relatively small, and the upper surface of the cutting blade 82 is shaped to gradually curve in a concave arc upwardly from the forward tooth to blend into the handle as shown.

As illustrated in FIG. 8, the forward cutting blade 78 is perpendicular to the horizontal axis of the tool portion 68, and the rear cutting blade 82 is offset laterally and at an angle relative to the forward cutting blade 78 to protect the user's fingers from the cutting blade. In order to protect the user's thumb from the rear cutting member 82 a laterally and longitudinally extended shoulder 90 is provided along the lower portion of the handle below the cutting member. In use of the present instrument the user's thumb is pushed by the shoulder 90 laterally away from the adjacent cutting edges as the instrument is passed through the shrimp.

In operation the shrimp is grasped in the same manner as described in connection with the form of the invention illustrated in FIG. 1, and the operation of the forward portion of the tool and forward cutting blade 78 is the same as described in connection with FIG. 1 as the tool is urged through the shrimp. The spear tail is opened in the same manner and the tail meats easily removed intact with the body meat of the shrimp.

As the operating portion of the tool is urged into and through the shrimp, the rearwardly spaced cutting blade 82 engages the upper portion of the first, second, third or fourth sections of the shrimp's shell and cutting and opening these sections of the shell. The entire meat of the shrimp may then be removed from the shell in one attractive piece almost entirely without waste. The runner 72 operates to guide the cutting blades 78, 82 through the shrimp, loosens the sand vein and partially loosens the shrimp meat from the shell.

While the modified form of the invention illustrated in FIGS. 6 and 8 has been described as having a metal tool portion 68 having a handle attached thereto, it will be understood that the instrument may be formed of a suitable tough, more or less rigid, plastic material and molded in one integral piece. The cutting edges of the forward and rear cutting blades may also be of any suitable design which results in a durable cutting edge.

FIG. 7 illustrates a still further modification of the present invention wherein the instrument is formed of a relatively tough, rigid plastic material, such as nylon and like materials, and may be molded in one piece. The instrument comprises a tool portion 100 and a handle portion 102. The tool portion 100 is generally elliptical in cross section and is tapered from the handle end to the tip end 104 such that the cross sectional dimension of the forward portion is smaller than the portion adjacent the handle. The tool portion 100 is formed with shallow curved upper and lower surfaces extending rearwardly to a point substantially midway between the ends of the tool portion. The surfaces of the body of the tool portion then extend substantially parallel to the longitudinal center line of the tool portion to the handle. The forward upper curved surface of the tool portion is arched or convexly shaped, and the bottom surface is concavely curved. A longitudinal runner 108 is provided along the bottom portion of the tool portion and comprises a long, smooth surface and a wedge shaped groove 110 on one side of the vertical center line of the tool portion. The runner 108 preferably extends from a point spaced rearwardly from the tip end 104 of tool portion 100 to the body of the handle.

The upper surface of the tool portion is provided with a cutting blade 114 extending continuously from a point spaced inwardly a short distance from the tip end of the tool portion, rearwardly, terminating at the thumb protector 116 of the handle 102. The cutting blade 114 comprises a flat blade having a series of serrations 118 cut in its upper surface as shown. The upper surface or edges of the cutting blade follow the convex curvature of the forward end portion of the tool portion 100, and at a point midway between the ends of the tool portion 100 curve upwardly in a gradual concave curve, terminating at the thumb protector 116 of the handle.

While the cutting blade 114 has been illustrated and described as commencing at a point spaced inwardly of the tip end of the tool portion of the instrument, it will be understood that the cutting member may be extended from the tip end to the handle.

In operation the tip end 104 of the tool portion 100 is inserted in the forward end of the viscera cavity of the shrimp and urged in a straight line through the shrimp.

The operation of the instrument is similar to that described in connection with the instrument of FIG. 6, the rear portion of the continuous cutting blade cutting through the first, second, third or fourth section of the upper portion of the shrimp's shell as the operating portion of the instrument passes through the shrimp. In this manner these sections of the shell are cut and opened, and the shrimp meat may then be removed in one attractive piece almost entirely without waste.

FIGS. 9 through 11 illustrate a still further form of the present invention. The numeral 120 represents a flat blade member having a continuous series of serrations 122 along its upper edge. The upper edge of the blade member is tapered downwardly from a relatively wide end to which a handle, not shown, may be attached to provide a narrow tip end 124. The bottom edge 126 of the blade member 120 is turned laterally to a position substantially at right angles to the blade member and provides a long, flat runner 128. The forward end of the runner 128, as indicated at 130, is tapered from the narrow tip end 124 outwardly and rearwardly a relatively short distance and then extends rearwardly in a line parallel to the flat surface of the blade for the remaining length of the blade. The rear edge 132 of the blade member 120 is provided with a tang 134 for fastening a suitable handle to the blade member.

In operation the tip end 124 of the blade member 120 is inserted in the forward end of the viscera cavity of the shrimp to be deshelled and the instrument urged to pass straight through the shrimp. The serrated cutting edge 122 of the blade member cuts upwardly through the viscera cavity wall, shoulder meat and shell, thus opening the shell and enabling the meat to be removed intact. The flat surface of the runner 128 acts to prevent the blade member 120 from passing downwardly into the body of the shrimp and, in addition, helps the operator to forcibly hold the shrimp in a straightened position.

From the foregoing description of the various forms of the present invention it will be apparent that the present shrimp deveining and deshelling instrument enables a substantial quantity of shrimp to be cleaned in a relatively short time. In addition to the increase in speed of the cleaning operation the present novel and improved instrument enables a large proportion of a quantity of shrimp of different sizes to be cleaned and deshelled, the meats being unbroken, in one piece and most attractive in appearance after cooking. Use of the present instrument reduces waste to a minimum.

It will be understood that the present instrument may also be used to clean other similar seafood, such as plate lobsters and the like.

Having thus described the invention, what is claimed is:

1. An instrument for deveining and removing the shell from shrimp, said instrument having a handle portion and a tool portion, said tool portion comprising a longitudinally extending blade extending upwardly vertically from the upper surface of said tool portion, said blade portion having a plurality of teeth, the forward edge of each of the teeth extending upwardly and forwardly and lying at an angle of less than 90 degrees relative to the longitudinal center line of the tool portion.

2. An instrument for deveining and shelling shrimp comprising an elongated tool portion and a handle portion, said tool portion having a cutting means on its upper surface and a runner at its lower surface, said runner having a long, smooth, substantially vertical surface defined by at least one wedge shaped groove extending along a portion of the length of the tool portion opposite said cutting means.

3. An instrument for deveining and shelling shrimp comprising an elongated tool portion having a cutting means thereon, said tool having an upwardly and rearwardly inclined forward surface rearwardly of said cutting means and a protruding shell deflector overhanging and projecting forwardly over the rear portion of said inclined surface for protecting the thumb during use.

4. An instrument for deveining and shelling shrimp comprising a tool portion and a handle, said tool portion having a cutting member on its upper surface, the upper surface of the portion of the tool extending rearwardly from the rearmost end of the cutting member being upwardly concave.

5. An instrument for deveining and shelling shrimp having a tool portion and a handle, said tool portion having a longitudinal upstanding blade on its upper surface, said blade having a plurality of teeth on its forward section and on its rearward section, said blade including a spacer between said sections, said spacer portion having an upper edge increasing in height rearwardly for causing the shell to be caught by the following teeth of the rearward section.

6. An instrument for deveining and shelling shrimp having a tool portion and a handle, said tool portion having a cutting member comprising a plurality of teeth, the top surface of the teeth being substantially flattened and inclined downwardly toward the forward end of the tool so that the teeth pass through a portion of the length of the shrimp without cutting the shell.

7. An instrument for deveining and removing the shell from a deheaded shrimp comprising a handle portion and an elongated arcuate tool portion extending forwardly from said handle portion, said tool portion and an adjacent coextensive portion of the handle having a generally elliptical cross section and being of gradually tapered conformation with a relatively long slender viscera cavity penetrating prong at the free end thereof, a longitudinal cutting blade along the upper surface of the tool portion for severing the shrimp flesh above the viscera cavity and for severing the shell, the bottom surface of the tool having a longitudinal groove on one side thereof defining a runner engageable in said viscera cavity to assist in guiding the tool through the shrimp.

8. An instrument as defined in claim 7 wherein the cutting blade comprises a plurality of teeth including a forward section and a rearward section.

9. An instrument for deveining and removing the shell from shrimp as defined in claim 1, wherein said handle portion is generally oval-shaped and is provided with concave recessed finger grips in its bottom surface to enable the instrument to be held lightly when wet during use.

References Cited by the Examiner

UNITED STATES PATENTS

| | | | |
|---|---|---|---|
| 2,561,359 | 7/51 | Gorton | 17—7 |
| 2,569,022 | 9/51 | Sagers | 17—7 |
| 2,648,094 | 8/53 | Paoli | 17—7 |
| 2,792,590 | 5/57 | Stone | 17—7 |
| 2,857,620 | 10/58 | Joseph | 17—7 |

SAMUEL KOREN, *Primary Examiner.*

CARL W. ROBINSON, LUCIE H. LAUDENSLAGER,
*Examiners.*